United States Patent
Tang et al.

(10) Patent No.: US 10,053,596 B2
(45) Date of Patent: Aug. 21, 2018

(54) CURABLE FILM-FORMING COMPOSITIONS DEMONSTRATING INCREASED WET-EDGE TIME

(71) Applicant: PRC-DeSoto International, Inc., Sylmar, CA (US)

(72) Inventors: Guangliang Tang, Stevenson Ranch, CA (US); Mikhail Khudiakov, Irvine, CA (US)

(73) Assignee: PRC-DeSoto International, Inc., Sylmar, CA (US)

(*) Notice: Subject to any disclaimer, the term of this patent is extended or adjusted under 35 U.S.C. 154(b) by 0 days.

(21) Appl. No.: 15/251,216

(22) Filed: Aug. 30, 2016

(65) Prior Publication Data

US 2018/0057707 A1    Mar. 1, 2018

(51) Int. Cl.
| | |
|---|---|
| *C08G 18/18* | (2006.01) |
| *C09D 175/06* | (2006.01) |
| *C08G 18/08* | (2006.01) |
| *C08G 18/16* | (2006.01) |
| *C08G 18/22* | (2006.01) |
| *C08G 18/24* | (2006.01) |

(52) U.S. Cl.
CPC ....... *C09D 175/06* (2013.01); *C08G 18/0847* (2013.01); *C08G 18/0852* (2013.01); *C08G 18/161* (2013.01); *C08G 18/227* (2013.01); *C08G 18/244* (2013.01)

(58) Field of Classification Search
CPC .. C08G 18/161; C08G 18/244; C08G 18/227; C08G 18/222; C08G 18/0847; C08G 18/0852
See application file for complete search history.

(56) References Cited

U.S. PATENT DOCUMENTS

| | | | | |
|---|---|---|---|---|
| 4,092,256 A | * | 5/1978 | Goodson | G11B 5/7028 252/62.54 |
| 4,151,056 A | * | 4/1979 | Park | C08F 290/06 428/442 |
| 5,902,835 A | | 5/1999 | Meier et al. | |
| 6,750,310 B1 | | 6/2004 | Skinner | |
| 8,318,830 B2 | | 11/2012 | Kohli Steck et al. | |
| 8,933,138 B2 | | 1/2015 | Hintermann et al. | |
| 2006/0099417 A1 | * | 5/2006 | Moireau | C03C 25/246 428/375 |
| 2010/0285234 A1 | * | 11/2010 | Van Den Berg | C08G 18/242 427/517 |
| 2014/0018461 A1 | | 1/2014 | Hintermann et al. | |

FOREIGN PATENT DOCUMENTS

| | | | | |
|---|---|---|---|---|
| EP | 0882748 A2 | 12/1998 | | |
| WO | WO 00/037524 | 6/2000 | | |
| WO | WO 2009050115 A1 | * 4/2009 | ........... | C08G 18/222 |
| WO | WO 2011/032837 | 3/2011 | | |

OTHER PUBLICATIONS

Farray et al., "Novel latent catalysts for 2-PUR systems", Progress in Organic Coatings 68 (2010) pp. 37-41.

* cited by examiner

*Primary Examiner* — Michael L Leonard
(74) *Attorney, Agent, or Firm* — Krisanne Shideler

(57) ABSTRACT

The present invention is directed to a curable film-forming composition comprising: (a) a curing agent comprising reactive isocyanate functional groups; (b) a film-forming compound comprising functional groups reactive with the reactive isocyanate functional groups in (a); (c) a photo-latent catalyst; (d) a beta-diketone having a flash point higher than 60° C. (140° F.); and (e) a beta-diketone having a flash point lower than or equal to 60° C. (140° F.). The invention is further directed to methods of controlling the rate of cure and increasing the wet-edge time of a curable film-forming composition comprising an isocyanate functional curing agent, by adding to the curable film-forming composition a catalyst component comprising: (i) a photo-latent catalyst; (ii) a beta-diketone having a flash point higher than 60° C. (140° F.); and (iii) a beta-diketone having a flash point lower than or equal to 60° C. (140° F.).

21 Claims, No Drawings

CURABLE FILM-FORMING COMPOSITIONS DEMONSTRATING INCREASED WET-EDGE TIME

FIELD OF THE INVENTION

The present invention relates to curable film-forming compositions and methods of controlling the rate of cure and increasing the wet-edge time of the curable film-forming compositions.

BACKGROUND OF THE INVENTION

Painting operations serve as a major production bottleneck in aircraft manufacturing and there is great interest in the industry to improve efficiency. On average, it takes 5 to 7 days to paint an entire aircraft during production. Coatings are usually manually sprayed instead of robotically sprayed because of the shape and size of the aircraft. In addition, to achieve the best performance and appearance and to avoid sagging from over-spray, one layer of coating is usually applied by two to three passes of the same coating in a period of 10 to 60 minutes. The second pass of coating must be able to wet well with the first pass of coating to avoid film defects such as orange peel, low gloss and high haze.

Polyurethane coatings are usually employed for aircraft because they have excellent chemical resistance, durability, low temperature flexibility, and heat stability. However, they generally cure slowly and have long dry-to-tape time (up to 20 hours). The slower the dry-to-tape time, the longer it takes to complete the painting cycle. Developing faster drying paints is an attractive approach to improving efficiency.

The addition of catalysts to the polyurethane coating can accelerate the drying process and shorten the dry-to-tape time. However, viscosity of the coating composition may increase too quickly for consistent spray application. Performance of the coating at the end of its pot life may also be different from that of the freshly mixed paint and sometimes coatings cannot meet specification requirements such as adhesion, chemical resistance and appearance. If the pot life is too short, the performance and appearance of the coating on one area of the aircraft could be unacceptably different from another area. Also, in the case of accelerated curing, the reaction is very fast and rapidly converts low molecular weight resins to a high molecular weight polymer with high crosslink density. This makes it very difficult for the next coating layer to blend with a previously applied layer, particularly at seams or edges, and often results in poor appearance such as high haze and low gloss in the overlap areas. This is commonly referred to as poor wet-edge. Wet-edge time is the interval of time in which a fresh layer of paint can blend into a previously applied paint when only part of the surface is sprayed with a fresh paint. Wet-edge time is especially important for painting an aircraft because multiple work crews are involved in the operation: the areas where paint layers applied by different teams overlap will look striped and hazy if the wet-edge time of a coating is too short. Short wet-edge time will prevent overspray from blending into a previously applied paint film, resulting in a rough surface. Streaks, tiger stripes, or other visual irregularities are not acceptable on commercial airplanes and a wet-edge time of at least 30 min is generally required for all aerospace topcoats.

It is desirable to provide a polyurethane coating system that has good pot life and long wet-edge time, but that cures fast with a short dry-to-tape time.

SUMMARY OF THE INVENTION

The present invention is directed to a curable film-forming composition comprising:
(a) a curing agent comprising reactive isocyanate functional groups;
(b) a film-forming compound comprising functional groups reactive with the reactive isocyanate functional groups in (a);
(c) a photo-latent catalyst;
(d) a beta-diketone having a flash point higher than 60° C. (140° F.); and
(e) a beta-diketone having a flash point lower than or equal to 60° C. (140° F.).

The present invention is further directed to a method of controlling the rate of cure of a curable film-forming composition. The method comprises adding to the curable film-forming composition a catalyst component comprising:
(i) a photo-latent catalyst;
(ii) a beta-diketone having a flash point higher than 60° C. (140° F.); and
(iii) an aliphatic beta-diketone having a flash point lower than or equal to 60° C. (140° F.). The curable film-forming composition comprises:
(a) a curing agent comprising reactive isocyanate functional groups; and
(b) a film-forming compound comprising functional groups reactive with the reactive isocyanate functional groups in the curing agent (a).

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The curing agent (a) used in the curable film-forming composition may be selected from one or more polyisocyanates such as diisocyanates and/or triisocyanates including biurets and isocyanurates. Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate. Biurets of any suitable diisocyanate including 1,4-tetramethylene diisocyanate and 1,6-hexamethylene diisocyanate may be used. Also, biurets of cycloaliphatic diisocyanates such as isophorone diisocyanate and 4,4'-methylene-bis-(cyclohexyl isocyanate) can be employed. Examples of suitable aralkyl diisocyanates from which biurets may be prepared are meta-xylylene diisocyanate and α,α,α',α'-tetramethylmeta-xylylene diisocyanate.

Trifunctional isocyanates may also be used as the curing agent, for example, trimers of isophorone diisocyanate, triisocyanato nonane, triphenylmethane triisocyanate, 1,3,5-benzene triisocyanate, 2,4,6-toluene triisocyanate, an adduct of trimethylol and tetramethyl xylylene diisocyanate sold under the name CYTHANE 3160 by CYTEC Industries, and DESMODUR N 3300, which is the isocyanurate of hexamethylene diisocyanate, available from Bayer Corporation. Specifically used polyisocyanates are trimers of diisocyanates such as hexamethylene diisocyanate and isophorone diisocyanate.

The polyisocyanate may also be one of those disclosed above, chain extended with one or more polyamines and/or polyols using suitable materials and techniques known to those skilled in the art to form a polyurethane prepolymer having isocyanate functional groups. Particularly suitable polyisocyanates are described in United States Patent Application Publication Number 2013/0344253 A1, paragraphs [0012]-[0033], incorporated herein by reference.

The curing agent (a) is present in the curable film-forming compositions in an amount ranging from 10 to 90 percent by weight, such as at least 40 percent by weight, or at least 45 percent by weight, and at most 65 percent by weight, or at most 60 percent by weight, based on the total weight of resin solids in the composition.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured.

The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The curable film-forming composition of the present invention further comprises at least one film-forming compound (b) having multiple functional groups reactive with the isocyanate groups in (a). Such functional groups are typically hydroxyl, thiol, and/or amine functional groups. The term "reactive" refers to a functional group capable of undergoing a chemical reaction with itself and/or other functional groups spontaneously or upon the application of heat or in the presence of a catalyst or by any other means known to those skilled in the art.

The film-forming compound may comprise a hydroxyl functional addition polymer, polyester polymer, polyurethane polymer, and/or polyether polymer. By "polymer" is meant a polymer including homopolymers and copolymers, and oligomers. By "composite material" is meant a combination of two or more different materials.

Often an acrylic polymer and/or polyester polymer having multiple hydroxyl functional groups is used. Note that the phrase "and/or" when used in a list is meant to encompass alternative embodiments including each individual component in the list as well as any combination of components. For example, the list "A, B, and/or C" is meant to encompass six separate embodiments that include A, or B, or C, or A+B, or A+C, or B+C, or A+B+C.

Suitable addition polymers include copolymers of one or more ethylenically unsaturated monomers such as alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer may include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 13 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are particularly suitable. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 8 to 30 carbon atoms, such as butyl glycidyl ether, octyl glycidyl ether, phenyl glycidyl ether and para-(tertiary butyl) phenyl glycidyl ether. Common glycidyl esters include those of the structure:

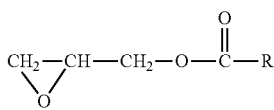

where R is a hydrocarbon radical containing from about 4 to about 26 carbon atoms. Usually, R is a branched hydrocarbon group having from about 8 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

In certain examples of the present invention, the polymer used in the curable film-forming composition comprises a fluorinated polymer. Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth)acrylate resins.

A polyester polymer may be used in the curable film-forming composition. Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Polyesters derived from cyclic esters such as caprolactone are also suitable.

Polyurethanes can also be used in the curable film-forming composition. Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are used often, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Examples of polyether polyols are polyalkylene ether polyols which include those having the following structural formula:

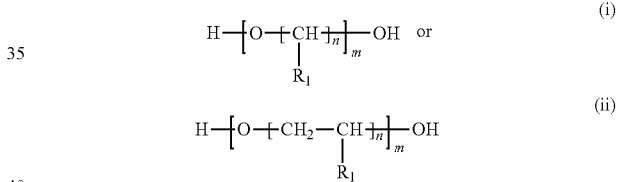

where the substituent $R_1$ is hydrogen or lower alkyl containing from 1 to 5 carbon atoms including mixed substituents, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers polyoxypropylene amines commercially available under the trademark designation JEFFAMINE®; amine functional acrylic polymers and polyester polymers prepared as known in the art are also suitable.

The film-forming compound (b) is present in the film-forming compositions in an amount ranging from 10 to 90 percent by weight, such as at least 35 percent by weight, or at least 40 percent by weight, and at most 60 percent by weight, or at most 50 percent by weight, based on the total weight of resin solids in the composition.

The curing agent (a) having isocyanate functional groups may be used in relative excess to the film-forming compound (b) in the curable film-forming composition. For example, the equivalent ratio of isocyanate groups in the curing agent to functional groups in the film-forming compound may be 1.1 to 5.0:1, often 1.1 to 1.7:1, or 1.5 to 1.7:1.

The multi-pack resin composition DESOTHANE CA 8905HP or DESOTHANE HS CA 8925/11050, both available from PPG Aerospace, may be used as the curing agent (a) and film-forming compound (b) in the composition of the present invention. Alternatively, DESOTHANE CA 8000B, a mixture of aliphatic polyisocyanates, may be used as the curing agent (a) and DESOTHANE CA8800/B70846, a mixture of polyol resins and a blend of pigments and fillers, or DESOTHANE CA8000/B900A, a mixture of polyol resins solution with 37.79% non-volatile material by weight, may be used as the film-forming compound (b). In another scenario, DESOTHANE CA9005B, a mixture of aliphatic polyisocyanates with 100% non-volatile material by weight, may be used as the curing agent (a) and DESOTHANE CA9005HP, a mixture of polyol resins solution with 47.92% non-volatile material by weight, may be used as the film-forming compound (b).

The curable film-forming composition of the present invention further comprises (c) a photolatent catalyst. Any photolatent catalysts based on Sn, Bi, Zr, Al, and Ti for polyurethane crosslinking known in the art are appropriate, such as those disclosed in U.S. Pat. No. 8,318,830; U.S. Pat. No. 8,933,138 and United States Patent Application Publication Number 20140018461. The photo-latent catalyst (c) often comprises at least one organometallic compound of titanium, tin, aluminum, zirconium and/or bismuth. Commercially available UV latent titanium catalysts include SOLYFAST 10 and SOLYFAST 12 available from BASF, and oxobis(2,2,6,6-tetramethyl-3,5-heptanedionato) titanium(IV), CAS#152248-67-4, available from Sigma-Aldrich.

The photolatent catalyst (c) is present in the film-forming compositions in an amount ranging from 0.01 to 2.0 percent by weight, such as at least 0.05 percent by weight, or at least 0.1 percent by weight, and at most 1.0 percent by weight, or at most 0.5 percent by weight, based on the total weight of resin solids in the composition.

The curable film-forming composition of the present invention further comprises (d) a beta-diketone having a flash point higher than 60° C. (140° F.). Flash points may be determined as indicated below. Such beta-diketones typically include aliphatic, hindered beta-diketones such as 1,3-diketones.

Examples of suitable aliphatic, hindered 1,3-diketones are as follows:

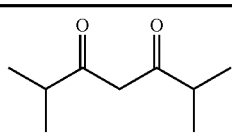

I

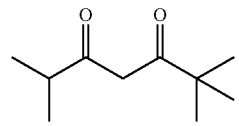

II

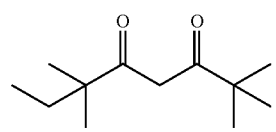

III

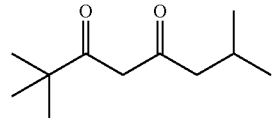

IV

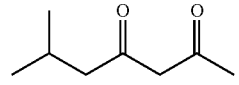

V

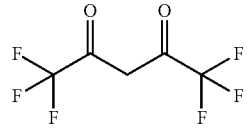

VI

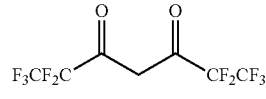

VII

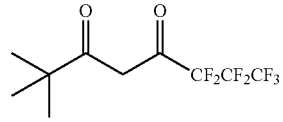

VIII

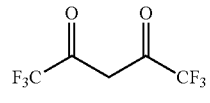

IX

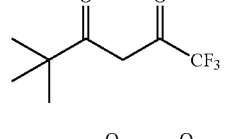

X

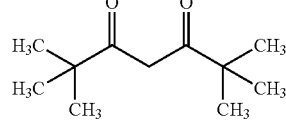

XI

Though not intending to be bound by theory, it is believed that the larger terminal organic groups on the hindered, aliphatic beta-diketone provide a "shielding effect" on the metal atom of the photolatent catalyst, thus controlling catalysis of the isocyanate and active hydrogen (e.g., hydroxyl, amine, thiol) reaction and effectively improving the wet-edge time of the curable film-forming composition.

The beta-diketone (d) is present in the film-forming compositions in an amount ranging from 0.01 to 8.0 percent by weight, such as at least 0.05 percent by weight, or at least 0.1 percent by weight, or at least 0.2 percent by weight, and at most 5.0 percent by weight, or at most 4 percent by weight, or at most 2 percent by weight, based on the total weight of resin solids in the composition.

The curable film-forming composition of the present invention further comprises (e) a beta-diketone having a flash point lower than or equal to 60° C. (140° F.). Such beta-diketones typically include aliphatic beta-diketones such as 2,4-pentanedione and 3-methyl-2,4-pentanedione.

The beta-diketone (e) is present in the film-forming compositions in an amount ranging from 0.05 to 10.0 percent by weight, such as at least 0.1 percent by weight, or at least 0.25 percent by weight, and at most 5.0 percent by weight, or at most 3 percent by weight, based on the total weight of resin solids in the composition.

The combination of beta-diketones (d) and (e) allow the curable film-forming compositions of the present invention to demonstrate both extended pot life and improved wet-edge time, as well as shorter dry-to-tape time, compared to compositions that do not contain both beta-diketones, as shown in the examples below. The span of time during which a coating composition is ready to apply to a substrate and still of low enough viscosity to be applied; i. e., the period of time between when the components are mixed to form the curable composition and when the curable composition can no longer be reasonably applied to a surface for its intended purpose is commonly referred to as the working time, or "pot life." Quantitatively, the time it takes for the viscosity of a composition to double from the initial viscosity is reported as "pot life". Both beta-diketones contribute to extended pot life, but it is believed that the slower evaporation rate of the beta-diketone (d) allows it to remain in the composition longer and further provide improved wet-edge time.

The curable film-forming compositions may be prepared as one-package or multi-package systems. For ambient cure coatings, it is not practical to store them as a one-package, but rather they must be stored as multi-package coatings to prevent the components from curing prior to use. The term "multi-package coatings" means coatings in which various components are maintained separately until just prior to application. The compositions of the present invention are usually multi-package coatings, such as a two-package coating, wherein the curing agent (a) is a first package and the film-forming compound (b) is the second package.

The components (c), (d), and (e) of the curable film-forming compositions may be added to the curable film-forming compositions individually, or as a catalytic package containing all three components, or they may be added singly or in various combinations to the curing agent (a) or film-forming compound (b).

The curable film-forming compositions of the present invention may further comprise a solvent. Examples of suitable solvents include alcohols such as 3-butoxypropan-2-ol and 1-propanol; ketones such as acetone, 2,6-dimethylheptan-4-one, 4,6-dimethylheptan-2-one, and heptan-2-one, esters such as 1 (or 2)-(2-methoxymethylethoxy) acetate, ethyl acetate, and 2-methoxy-1-methylethyl acetate; and aromatic solvents including xylene and 4-chloro-α, α, α-trifluorotoluene. Mixtures of solvent may also be used. Particular examples of solvent blends include DESOTHANE CA8000C and CA9005C, available from PPG Aerospace. When the solvent is present, it may be provided as a separate package and/or combined with either or both of the other two packages. Different solvents may be present in different packages for stability purposes.

The film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate.

The film-forming composition can additionally include a variety of optional ingredients and/or additives that are somewhat dependent on the particular application of the curable composition, such as pigments or other colorants, reinforcements, thixotropes, accelerators, surfactants, plasticizers, extenders, stabilizers, corrosion inhibitors, diluents, hindered amine light stabilizers, UV light absorbers, and antioxidants. The curable film-forming composition may be a color coat or clear coat; it may be opaque, translucent, tinted transparent, or colorless transparent.

The curable film-forming compositions of the present invention may be used as coatings on substrates. Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain examples of the present invention, the substrate comprises a composite material such as a plastic or a fiberglass composite. Often the substrates are used in turbines and aircraft parts such as airfoils, wings, stabilizers, rudders, ailerons, engine inlets, propellers, rotors, fuselage and the like.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents that are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

The curable film-forming composition is applied to at least one surface of the substrate. A substrate may have one continuous surface, or two or more surfaces such as two opposing surfaces.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-5 mils (25.4-127 microns), often 1-3 mils (25.4-76.2 microns).

The film-forming compositions can be applied directly to the surface of the substrate or onto a primer coat or other coating, such as an electrocoat or topcoat, on the substrate. Suitable primers include commercially available aerospace compliant primers such as high solids epoxy primers. A particular example is DESOPRIME CA7700, a corrosion resistant epoxy primer supplied by PPG Aerospace. Multiple coating layers such as a primer and a colored base coat may be applied to the substrate prior to application of the curable film-forming composition of the present invention.

The compositions may be applied to a substrate as a monocoat or they may be part of a multi-layer coating composite comprising a substrate with various coating layers applied thereto. As such, they may be used as a pretreatment layer, primer, base coat and/or clear coat. At least one of the base coat and clear coat may contain colorant.

The present invention further provides a method of controlling the rate of cure of a curable film-forming composition and a method of increasing the wet-edge time of a curable film-forming composition. The methods comprise adding to the curable film-forming composition a catalyst component comprising:

(i) a photo-latent catalyst such as any of those disclosed above;

(ii) a beta-diketone having a flash point higher than 60° C. (140° F.) such as any of those disclosed above; and (iii) an aliphatic beta-diketone having a flash point lower than or equal to 60° C. (140° F.) such as any of those disclosed above. The curable film-forming composition comprises:

(a) a curing agent comprising reactive isocyanate functional groups; and (b) a film-forming compound comprising functional groups reactive with the reactive isocyanate functional groups in the curing agent (a).

The curing agent (a) and film-forming compound (b) may be any of those discussed above.

After adding the catalyst component to the curable film-forming composition, the methods may further comprise applying the curable film-forming composition to a substrate to form a coated substrate; and exposing the coated substrate to conditions for a time sufficient to at least partially cure the curable film-forming composition. The composition can be cured by allowing it to stand at ambient temperature, or a combination of ambient temperature cure and baking, or by baking alone. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). The composition will typically cure under ambient conditions in less than 5 hours. The composition can also be cured by baking at temperatures from 100 to 160° F. (37.8 to 71.1° C.) for a period from 15 min to 3 hours or a combination of ambient cure and baking. Alternatively, the coated substrate may be exposed to actinic radiation for a time sufficient to at least partially cure the curable film-forming composition. Typical actinic radiation conditions are 315 to 400 nm (UVA) at an irradiation intensity of 1 to 100 mW/cm$^2$ with a total UV dose from 0.5 to 10 J/cm$^2$. The composition will typically cure in less than 2 hours after the exposure to actinic radiation.

Each of the characteristics and examples described above, and combinations thereof, may be said to be encompassed by the present invention. The present invention is thus drawn to the following nonlimiting aspects:

1. A curable film-forming composition comprising:
   (a) a curing agent comprising reactive isocyanate functional groups;
   (b) a film-forming compound comprising functional groups reactive with the reactive isocyanate functional groups in (a);
   (c) a photo-latent catalyst;
   (d) a beta-diketone having a flash point higher than 60° C. (140° F.); and
   (e) a beta-diketone having a flash point lower than or equal to 60° C. (140° F.).

2. The curable film-forming composition according to aspect 1, wherein the beta-diketone (d) comprises an aliphatic, hindered beta-diketone.

3. The curable film-forming composition according to any of aspects 1 to 2, wherein the beta-diketone (e) comprises an aliphatic beta-diketone.

4. The curable film-forming composition according to aspect 3, wherein the beta-diketone (e) comprises 2,4-pentanedione.

5. The curable film-forming composition according to any of aspects 1 to 4, wherein the curing agent (a) comprises a diisocyanate and/or a triisocyanate.

6. The curable film-forming composition according to any of aspects 1 to 5, wherein the film-forming compound (b) comprises an acrylic polymer, a polyether polymer, and/or a polyester polymer.

7. The curable film-forming composition according to any of aspects 1 to 6, wherein the photo-latent catalyst (c) comprises at least one organometallic compound of titanium, tin, aluminum, zirconium and/or bismuth.

8. The curable film-forming composition according to any of aspects 1 to 7, wherein the photo-latent catalyst (c) is present in the curable film-forming composition in an amount of 0.01 to 2.0 percent by weight, based on the total weight of resin solids in the curable film-forming composition.

9. The curable film-forming composition according to any of aspects 1 to 8, wherein the beta-diketone (d) is present in the curable film-forming composition in an amount of 0.01 to 8.0 percent by weight, based on the total weight of resin solids in the curable film-forming composition.

10. The curable film-forming composition according to any of aspects 1 to 9, wherein the curable film-forming composition comprises a clear coat.

11. A method of controlling the rate of cure of a curable film-forming composition and/or increasing the wet-edge time of a curable film-forming composition, comprising adding to the curable film-forming composition a catalyst component comprising:
   (i) a photo-latent catalyst;
   (ii) a beta-diketone having a flash point higher than 60° C. (140° F.); and
   (iii) an aliphatic beta-diketone having a flash point lower than or equal to 60° C. (140° F.), wherein the curable film-forming composition comprises:
   (a) a curing agent comprising reactive isocyanate functional groups; and
   (b) a film-forming compound comprising functional groups reactive with the reactive isocyanate functional groups in the curing agent (a).

12. The method according to aspect 11, wherein the beta-diketone (ii) comprises an aliphatic, hindered beta-diketone.

13. The method according to any of aspects 11 to 12, wherein the beta-diketone (iii) comprises 2,4-pentanedione.

14. The method according to any of aspects 11 to 13, wherein the curing agent (a) comprises at least one of a diisocyanate and a triisocyanate.

15. The method according to any of aspects 11 to 14, wherein the film-forming compound (b) comprises at least one of an acrylic polymer, a polyether polymer, and a polyester polymer.

16. The method according to any of aspects 11 to 15, wherein the photo-latent catalyst (i) comprises at least one organometallic compound of titanium, tin, aluminum, zirconium or bismuth.

17. The method according to any of aspects 11 to 16, further comprising after adding the catalyst component to the curable film-forming composition: applying the curable film-forming composition to a substrate to form a coated substrate; and exposing the coated substrate to conditions for a time sufficient to at least partially cure the curable film-forming composition.

18. The method according to any of aspects 11 to 17, wherein the coated substrate is exposed to actinic radiation or to an elevated temperature for a time sufficient to at least partially cure the curable film-forming composition.

The following examples are intended to illustrate various aspects of the invention, and should not be construed as limiting the invention in any way.

EXAMPLES

Equipment and Testing Methods

UV-A Lamp

Cure-Tek Ultraviolet Paint Curing Lamp-UVA400A (400 Watts nominal power) was purchased from H&S Auto Shot. UV irradiation intensity was set in the range of 1.5-2.0 mW/cm$^2$.

Viscosity

Fresh-mixed and pot life viscosity of the coating were measured with a #2 Signature Zahn cup and reported in units of seconds. For industrial applications, it is recommended to have three to four hours of pot life with a viscosity less than 30 seconds to obtain good appearance and high performance, such as gloss and adhesion after spray application.

Wet-Edge Evaluation

This test was conducted in a spray booth with an air flow of 75 to 125 linear feet per minute (0.381 to 0.635 meters per second). A layer of the mixed composition was sprayed over the entire surface of a 12 by 24 inch (304.8 by 609.6 mm) panel at a dry film thickness 0.8-1.0 mils (20 to 25 micrometer). After 30 minutes, another layer of the coating was sprayed over half of the panel. After the second application, the panel was kept in the spray booth for one hour to flash off the solvents. The panel was exposed to a UV-A lamp for curing for 30 minutes. 20 degree gloss and haze values at both the wet-edge area (over sprayed from the second coat application) and the two-coat overlain area were measured. For a high gloss coating, the haze value should be less than 50 and the 20 degree gloss value should be higher than 80.

Dry-to-Tape Time

After spray application of the coating, the coated panels were dried in the spray booth at ambient temperature and humidity for 60 minutes to flash off the solvents. The panels were placed under a UV-A lamp to accelerate the curing and exposed for 30 minutes. Within 5 minutes after removing the panels from the UV-A lamp, a strip of one-inch wide masking tape, such as 2307 or equivalent type, was applied to check the dry-to-tape results. The tape was pressed down by using the tape roll with about 5 pounds of force. The coatings were left at ambient temperature for further curing and a tape was applied every 30 minutes to monitor the curing. The masking tape strips were removed after 24 hours and the area under each strip was visually checked for tape marks or residue on the coating surface. Dry-to-tape time was determined as the period of time starting from the completion of coating application to the point when there is no visible tape mark or residue.

MEK Resistance

Solvent resistance was determined in accordance with ASTM D5402 (2015) by using a gauze cloth that was saturated with MEK solvent. MEK double rubs were recorded at the point when noticeable scratches were observed. If no noticeable scratches were observed after 200 MEK double rubs, the result was recorded as >200. For this invention, efficiency of accelerated curing of the coating with the addition of photolatent catalyst to the polyurethane coating was determined with MEK double rubs after exposure to UV light.

Gloss and Haze

Gloss over the wet-edge area was determined according to ASTM D523 (Standard Test Method for Specular Gloss, 2014) using a BYK-Gardner Haze-Gloss meter. The 20° geometry is advantageous for comparing specimens having 60° gloss values higher than 70. Since the curable film-forming compositions were designed to demonstrate a gloss higher than 80 at 20 degrees, all gloss data were tested at 20 degrees. As a comparison to monitor the improvement of wet-edge, panels with low gloss readings were also tested at 20 degrees.

Reflection haze was determined at according to E430-11 (Standard Test Methods for Measurement of Gloss of High-Gloss Surfaces by Abridged Goniophotometry, 2011).

Impact Resistance

Impact resistance was determined according to ASTM D2794 (Standard Test Method for Resistance of Organic Coatings to the Effects of Rapid Deformation, 2010) by BYK-Gardner 5546 Metal SPI Heavy-Duty Impact Tester with the unit of in-lb.

Skydrol Resistance

The overnight ambient cured coated panels were immersed in the hydraulic fluid Skydrol LD-4 (available from Solutia, Inc.) at a temperature of 140° F. for 24 hours. Surfaces of the coatings were checked for paint peeling, blistering or significant color change. Any signs of coating failure were recorded as "fail"; otherwise, it was recorded as "pass".

Crosshatch Adhesion

Crosshatch adhesion was determined in accordance with ASTM D3359 (Standard Test Methods for Measuring Adhesion by Tape Test), method B, 2009. A crosshatch pattern was scribed through the coating down to the substrate. A strip of 1-inch wide masking tape (such as 3M 250 or equivalent) was applied. The tape was pressed down using two passes of a 4.5-pound rubber covered roller. The tape was removed in one abrupt motion perpendicular to the panel. The adhesion was rated by a visual examination of the paint at the crosshatch area using the provided rating system. Dry adhesion was tested after fully curing of the coating system for 7 days. Wet adhesion was tested on a fully cured coating system after immersing it in 140° F. water for 24 hours. Panels were removed from the water, wiped dry with a paper towel and tested after 5 minutes. Panels were rated as follows:
- a) 5B: The edges of the cuts are completely smooth; none of the squares of the lattice is detached.
- b) 4B: Small flakes of the coating are detached at intersections; less than 5% of the area is affected.
- c) 3B: Small flakes of the coating are detached along edges and at intersections of cuts. The area affected is 5 to 15% of the lattice.
- d) 2B: The coating has flaked along the edges and on parts of the squares. The area affected is 15 to 35% of the lattice.
- e) 1B: The coating has flaked along the edges of cuts in large ribbons and whole squares have detached. The area affected is 35 to 65% of the lattice.
- f) 0B: Flaking and detachment worse than Grade 1.

The following epoxy primer and polyurethane basecoat were applied to substrates for use in the examples: DESOPRIME CA7700 is a corrosion resistant epoxy primer supplied by PPG Aerospace. 100 parts of CA7700 base component are mixed with 76.9 parts of CA7700BE activator by weight. DESOTHANE HS CA8000/B70846 is a three-component ambient cure white polyurethane topcoat supplied by PPG Aerospace. 100 parts of CA8000/B70846 base component are mixed with 39.0 parts of CA8000B activator, and 31.0 parts of CA8000C by weight.

The raw materials used in the example formulations are described and summarized in the following table, including flash point data. Flash point data were provided by suppliers and indicated as measured using ASTM D56-16—"Test Method for Flash Point by Tag Closed Tester", also known as the "Closed Cup" flash point test, 2016.

TABLE 1

Raw materials

| Raw Materials | Description | Suppliers | Flash Point (° F.), Close up |
|---|---|---|---|
| K-FLEX A308 | Polyester Polyol | King Industries | NA |
| CAPA4101 | Polyester Polyol | Perstorp | NA |
| JONCRYL 909 | Acrylic Polyol | BASF | 77.0 |
| BYK 320 | Additive | BYK | 100.0 |
| n-Butyl Acetate | Solvent | The Dow Chemical | 77.0 |
| Di-isobutyl Ketone | Solvent | The Dow Chemical | 120.0 |
| Methyl Amyl Ketone | Solvent | The Dow Chemical | 102.0 |
| DOWANOL PMA | Solvent | The Dow Chemical | 108.0 |
| SOLYFAST 10 | Catalyst | BASF | NA |
| 2,4-pentanedione | Solvent | Sigma-Aldrich | 100.0 |
| 2,2,6,6-tetramethyl-3,5-heptanedione (TMHD) | Solvent | Sigma-Aldrich | 153.0 |
| 3-methyl-2,4-pentanedione | Solvent | Sigma-Aldrich | 135.0 |
| DOWANOL DPMA | Solvent | The Dow Chemical | 187.0 |

TABLE 1-continued

Raw materials

| Raw Materials | Description | Suppliers | Flash Point (° F.), Close up |
|---|---|---|---|
| DESMODUR N3390BA/SN | Polyisocyanate | Covestro | 122.0 |

Substrate Preparation Procedure:

Coating layers were applied with an HPLV spray gun in a spray booth with an air flow of 75 to 125 linear feet per minute (0.381 to 0.635 meters per second). First, an aluminum panel was wiped with solvents such as ketones to remove the grease, abraded with SCOTCHBRITE and cleaned with solvents again. An aerospace qualified primer was applied to the cleaned surface to a dry film thickness of 1.0 mil (25 micrometer). After 2 hours of ambient cure of the primer, a CA8000/B70846 basecoat was applied onto the primer to obtain a dry film thickness of around 2 mils (50 microns).

Coating Application Procedure:

After 2 to 8 hours of ambient cure of the basecoat, a clearcoat was applied in a spray booth with an air flow of 75 to 125 linear feet per minute (0.381 to 0.635 meters per second) to obtain a dry film thickness of around 2 mils (50 microns).

After the application of the coating, the coated panels were dried in the spray booth to flash off the solvents for one hour. Then the panels were placed under a UV-A lamp for 30 minutes. Methyl ketone resistance and dry-to-tape properties were measured to monitor the drying time.

Example Formulations

The compositions for each example were prepared from the ingredients listed in the following table. Each contains three polyols of different structures to balance the performance, such as chemical resistance, flexibility, and weathering resistance. The K-FLEX A308 is a low viscosity, 100% active, linear, saturated, aliphatic polyester diol with primary hydroxyl groups and hydroxyl value of 260 mg KOH/g. CAPA 4101 is a tetra-functional polyol terminated with primary hydroxyl groups and with hydroxyl value of 216~232 mg KOH/g. JONCRYL 909 is a fast curing, acrylic polyol for medium solids polyurethane coating applications and with hydroxyl value of 111-123 mg KOH/g. The equivalent ratio of polyisocyanate to polyol is set at 1.4 for a higher chemical resistance. Volatile organic content (VOC) of the coating is formulated to 420 g/L for aerospace coatings application to apply with gravity spray gun and formulated to a solid content of 57.8%. Photolatent catalyst was used in Control Examples 2 to 7 at a level of 0.2% by weight based on the total formulation weight, or 0.35% by weight based on total solid resin weight.

Control Examples

TABLE 2

Control examples 1 to 7

| Raw Materials | Control 1 Wt (g) | Control 2 Wt (g) | Control 3 Wt (g) | Control 4 Wt (g) | Control 5 Wt (g) | Control 6 Wt (g) | Control 7 Wt (g) |
|---|---|---|---|---|---|---|---|
| K-FLEX A308 | 5.77 | 5.77 | 5.77 | 5.77 | 5.77 | 5.77 | 5.77 |
| CAPA4101 | 17.31 | 17.31 | 17.31 | 17.31 | 17.31 | 17.31 | 17.31 |
| JONCRYL 909 | 8.48 | 8.48 | 8.48 | 8.48 | 8.48 | 8.48 | 8.48 |
| BYK 320 | 0.40 | 0.40 | 0.40 | 0.40 | 0.40 | 0.40 | 0.40 |

TABLE 2-continued

Control examples 1 to 7

| Raw Materials | Control 1 Wt (g) | Control 2 Wt (g) | Control 3 Wt (g) | Control 4 Wt (g) | Control 5 Wt (g) | Control 6 Wt (g) | Control 7 Wt (g) |
|---|---|---|---|---|---|---|---|
| n-Butyl Acetate | 5.77 | 5.77 | 5.77 | 5.77 | 5.77 | 5.77 | 5.77 |
| Di-isobutyl Ketone | 12.69 | 12.69 | 12.69 | 12.69 | 12.69 | 12.69 | 12.69 |
| Methyl Amyl Ketone | 11.54 | 11.54 | 11.54 | 11.54 | 11.54 | 11.54 | 11.54 |
| DOWANOL PMA | 6.31 | 6.11 | 5.86 | 5.86 | 5.61 | 4.61 | 4.61 |
| SOLYFAST 10 | 0.00 | 0.20 | 0.20 | 0.20 | 0.20 | 0.20 | 0.20 |
| 2,4-pentanedione | 0.00 | 0.00 | 0.25 | 0.00 | 0.50 | 1.50 | 0.00 |
| TMHD | 0.00 | 0.00 | 0.00 | 0.25 | 0.00 | 0.00 | 1.50 |
| DESMODUR N3390BA/SN | 31.73 | 31.73 | 31.73 | 31.73 | 31.73 | 31.73 | 31.73 |
| Total | 100.00 | 100.00 | 100.00 | 100.00 | 100.00 | 100.00 | 100.00 |

TABLE 3

Properties of the control examples 1 to 7

| | Control 1 | Control 2 | Control 3 | Control 4 | Control 5 | Control 6 | Control 7 |
|---|---|---|---|---|---|---|---|
| SOLYFAST 10, % | 0.00 | 0.20 | 0.20 | 0.20 | 0.20 | 0.20 | 0.20 |
| 2,4-pentanedione | | | 0.25 | | 0.50 | 1.50 | |
| TMHD | | | | 0.25 | | | 1.50 |
| Pot life viscosity (s) | | | | | | | |
| Fresh Mixed | 17.80 | 17.88 | 17.85 | 17.89 | 17.80 | 17.79 | 17.85 |
| 1 hour | 17.89 | gelled in 30 min | 19.30 | 20.21 | 17.86 | 17.85 | 18.27 |
| 2 hours | 18.00 | | 24.59 | 25.85 | 20.01 | 18.10 | 19.12 |
| 3 hours | 18.10 | | 52.33 | 34.91 | 26.42 | 19.36 | 19.70 |
| 4 hours | 18.26 | | gelled | gelled | 43.23 | 22.89 | 23.10 |
| Drying results after UV exposure | | | | | | | |
| Drying results | wet | tack-free | tack-free | wet | tack-free | tack-free | wet |
| MEK double rubs | 0 | >200 | >200 | 0 | >200 | >200 | 0 |
| Dry-to-tape time (hrs) | 16.0 | 1.5 | 1.5 | 4.0 | 1.5 | 1.5 | 5.0 |

1. Control 1 is a polyurethane coating without catalyst. It was low in viscosity after 4 hours, but took about 16 hours to cure.
2. Control 2 is a polyurethane coating formulated with 0.20% by weight based on total formulation of photolatent catalyst. It cured very fast with excellent MEK resistance, but it had very short pot life and gelled in 30 minutes.
3. Control 3 is a polyurethane coating formulated with the photolatent catalyst combined with 0.25% by weight based on total formulation of 2,4-pentanedione. Viscosity was significantly reduced and the pot life was extended up to 3 hours. It cured very fast with excellent MEK resistance, but it developed high viscosity after 3 hours and gelled in 4 hours.
4. Control 4 is a polyurethane coating formulated with the photolatent catalyst combined with 0.25% by weight based on total formulation of 2,2,6,6-tetramethyl-3, 5-heptanedione (TMHD). Viscosity was also significantly reduced and the pot life was extended up to 2 hours. The addition of TMHD, the hindered diketone, obviously retarded the curing as the coating film was wet after exposure to UV light. The composition required another 2 to 3 hours to cure to the stage of dry-to-tape.
5. Control 5 is a polyurethane coating formulated with the photolatent catalyst combined with 0.50% by weight based on total formulation of 2,4-pentanedione. Viscosity was significantly reduced and the pot life was extended up to 3 hours. It cured very fast with excellent MEK resistance, but it developed high viscosity after 4 hours.
6. Control 6 is a polyurethane coating formulated with the photolatent catalyst combined with 1.50% by weight based on total formulation of 2,4-pentanedione. Viscosity was significantly reduced and the pot life was extended up to 4 hours. It cured very fast with excellent MEK resistance.
7. Control 7 is a polyurethane coating formulated with the photolatent catalyst combined with 1.50% by weight based on total formulation of TMHD. Viscosity was significantly reduced and a pot life up to 4 hours was achieved. It further demonstrated that the addition of TMHD, the hindered diketone, significantly retarded the curing, exhibited wet coating film even after exposure to UV light and took another 3 or 4 hours to complete the curing.

As shown in Table 3, the polyurethane coating cured very slowly in the absence of catalyst (Control Example 1). The addition of photolatent catalyst to the polyurethane coating significantly accelerated the curing after exposure to UV radiation and provided excellent chemical resistance. The coating composition without diketone (Control Example 2) had a very short pot life and gelled in less than 30 minutes in the presence of photolatent catalyst. The addition of diketone to the photolatent catalyzed polyurethane coating (Control Examples 3 to 7) significantly extended the pot life. The incorporation of low flash point diketone, such as 2,4-pentanedione (Control Examples 3, 5, and 6) did not slow down the curing. However, the incorporation of high flash point, hindered diketone, such as 2,2,6,6-tetramethyl-3,5-heptanedione (Control Examples 4 and 7) significantly retarded the curing and the coatings exhibited as a wet film after UV radiation.

Wet-Edge Results

The following two solvents were added to catalyzed polyurethane coating formulations that included 1.5% 2,4-pentanedione to evaluate the wet-edge time. Control Example 8 included the solvent 3-methyl-2,4-pentanedione. It is a liquid diketone with a boiling point of 173° C. and flash point of 135° F. Control Example 9 contained a slow evaporation solvent with high flash point, DOWANOL DPMA. It is a liquid with a boiling point of 209° C. and flash point of 190° F.

TABLE 4

Control examples 8 and 9 for wet-edge evaluation

| Raw Materials | Control 8 Wt (g) | Control 9 Wt (g) |
|---|---|---|
| K-FLEX A308 | 5.77 | 5.77 |
| CAPA4101 | 17.31 | 17.31 |
| JONCRYL 909 | 8.48 | 8.48 |
| BYK 320 | 0.40 | 0.40 |
| n-Butyl Acetate | 5.77 | 5.77 |
| Di-isobutyl Ketone | 12.69 | 12.69 |
| Methyl Amyl Ketone | 11.54 | 11.54 |
| DOWANOL PMA | 3.61 | 3.61 |
| SOLYFAST 10 | 0.20 | 0.20 |
| 2,4-pentanedione | 1.50 | 1.50 |
| 3-methyl-2,4-pentanedione | 1.00 | 0.00 |
| DOWANOL DPMA | 0.00 | 1.00 |
| DESMODUR N3390BA/SN | 31.73 | 31.73 |
| Total | 100.00 | 100.00 |

TABLE 5

Wet-edge results of the control coatings

| | Control 6 | Control 8 | Control 9 |
|---|---|---|---|
| SOLYFAST 10, % | 0.20 | 0.20 | 0.20 |
| 2,4-pentanedione | 1.50 | 1.50 | 1.50 |
| 3-methyl-2,4-pentanedione | | 1.00 | |
| DOWANOL DPMA | | | 1.00 |
| 4 hours viscosity | 22.89 | 21.40 | 21.10 |
| Drying results after UV exposure | | | |
| Drying results | tack-free | tack-free | tack-free |
| MEK double rubs | >200 | >200 | >200 |
| Dry-to-tape time (hrs) | 1.5 | 1.5 | 1.5 |
| Two-coat area gloss results | | | |
| Haze | 31.7 | 19.8 | 22.5 |
| 20 Gloss | 83.0 | 83.7 | 84.2 |
| Wet-Edge area gloss results | | | |
| Haze | 423.4 | 374.5 | 358.6 |
| 20 Gloss | 13.8 | 10.4 | 15.4 |

Control Example 6 is a photolatent catalyzed polyurethane coating that included 1.50% by weight based on total formulation of 2,4-pentanedione.

Control Example 8 is a photolatent catalyzed polyurethane coating that included 1.50% 2,4-pentanedione and 1.0% 3-methyl-2,4-pentanedione by weight based on total formulation.

Control Example 9 is a photolatent catalyzed polyurethane coating that included 1.50% 2,4-pentanedione and 1.0% DOWANOL DPMA by weight based on total formulation.

As shown in Table 5, the catalyzed polyurethane coating that included 1.50% 2,4-pentanedione (Control Example 6) exhibited well-controlled pot life and cured fast to excellent MEK resistance, but the coating had very low gloss and high haze values, indicating poor wet-edge. Addition of a low flash point diketone (3-methyl-2,4-pentanedione, Control Example 8) with flash point of 135° F. or slow evaporating solvent (DOWANOL DPMA, Control Example 9) with flash point of 190° F. did not improve the wet-edge time.

All of the Control Examples 6, 8, and 9 had very low gloss and very high haze values and were very far from meeting the haze requirement of less than 50 and the 20 degree gloss requirement of more than 80 for general acceptable appearance criteria.

Invention Examples

Example 1 is a photolatent catalyzed polyurethane coating formulated with 0.25% of 2,4-pentanedione and 0.25% of 2,2,6,6-tetramethyl-3,5-heptanedione (TMHD) by weight based on total formulation.

Example 2 is a photolatent catalyzed polyurethane coating formulated with 0.50% of 2,4-pentanedione and 0.25% of TMHD by weight based on total formulation.

Example 3 is a photolatent catalyzed polyurethane coating formulated with 1.00% of 2,4-pentanedione and 0.25% of TMHD by weight based on total formulation.

Example 4 is a photolatent catalyzed polyurethane coating formulated with 1.50% of 2,4-pentanedione and 0.125% of TMHD by weight based on total formulation.

Example 5 is a photolatent catalyzed polyurethane coating formulated with 1.50% of 2, 4-pentanedione and 0.25% of TMHD by weight based on total formulation.

TABLE 6

Examples of the invention (1 to 5)

| Raw Materials | Example 1 Wt (g) | Example 2 Wt (g) | Example 3 Wt (g) | Example 4 Wt (g) | Example 5 Wt (g) |
|---|---|---|---|---|---|
| K-FLEX A308 | 5.77 | 5.77 | 5.77 | 5.77 | 5.77 |
| CAPA4101 | 17.31 | 17.31 | 17.31 | 17.31 | 17.31 |
| JONCRYL 909 | 8.48 | 8.48 | 8.48 | 8.48 | 8.48 |
| BYK 320 | 0.40 | 0.40 | 0.40 | 0.40 | 0.40 |
| n-Butyl Acetate | 5.77 | 5.77 | 5.77 | 5.77 | 5.77 |
| Di-isobutyl Ketone | 12.69 | 12.69 | 12.69 | 12.69 | 12.69 |
| Methyl Amyl Ketone | 11.54 | 11.54 | 11.54 | 11.54 | 11.54 |
| DOWANOL PMA | 6.11 | 5.36 | 4.86 | 4.49 | 4.36 |
| SOLYFAST 10 | 0.20 | 0.20 | 0.20 | 0.20 | 0.20 |
| 2,4-pentanedione | 0.00 | 0.50 | 1.00 | 1.50 | 1.50 |
| TMHD | 0.00 | 0.25 | 0.25 | 0.125 | 0.25 |
| DESMODUR N3390BA/SN | 31.73 | 31.73 | 31.73 | 31.73 | 31.73 |
| Total | 100.00 | 100.00 | 100.00 | 100.00 | 100.00 |

TABLE 7

Properties of examples 1 to 5

|  | Example 1 | Example 2 | Example 3 | Example 4 | Example 5 |
|---|---|---|---|---|---|
| SOLYFAST 10, % | 0.20 | 0.20 | 0.20 | 0.20 | 0.20 |
| 2,4-pentanedione | 0.25 | 0.50 | 1.0 | 1.5 | 1.5 |
| 2,2,6,6-tetramethyl-3,5-heptanedione | 0.25 | 0.25 | 0.25 | 0.125 | 0.25 |
| Pot life viscosity | | | | | |
| Fresh Mixed | 17.83 | 17.79 | 17.72 | 17.80 | 17.84 |
| 1 hour | 17.88 | 17.84 | 18.18 | 17.84 | 17.90 |
| 2 hours | 23.15 | 19.60 | 18.66 | 18.22 | 18.30 |
| 3 hours | 32.68 | 24.11 | 21.52 | 19.30 | 19.20 |
| 4 hours | 48.33 | 31.70 | 26.24 | 22.60 | 22.50 |
| Drying results after UV exposure | | | | | |
| Drying results | tack-free | tack-free | tack-free | tack-free | tack-free |
| MEK double rubs | >200 | >200 | >200 | >200 | >200 |
| Dry-to-tape time (hrs) | 1.5 | 1.5 | 1.5 | 1.5 | 1.5 |
| Two-coat area gloss results | | | | | |
| Haze | 25.5 | 21.5 | 22.3 | 20.8 | 18.9 |
| 20 Gloss | 84.4 | 84.5 | 83.6 | 84.5 | 85.0 |
| Wet-Edge area gloss results | | | | | |
| Haze | 64.2 | 45.2 | 24.7 | 34.3 | 30.4 |
| 20 Gloss | 82.4 | 82.6 | 84.1 | 83.9 | 83.8 |
| Other physical properties | | | | | |
| Impact resistance | 80/80 | 80/80 | 80/80 | 80/80 | 80/80 |
| Skydrol resistance | pass | pass | pass | pass | pass |
| Dry/Wet adhesion | 5B/5B | 5B/5B | 5B/5B | 5B/5B | 5B/5B |

As shown in Table 7, the photolatent catalyst-catalyzed polyurethane coatings of the present invention, formulated with a low flash point diketone such as 2,4-pentanedione in combination of a high flash point diketone, such as 2,2,6,6-tetramethyl-3,5-heptanedione (TMHD), not only demonstrated well-controlled pot life, very fast cure, excellent MEK resistance, and dramatically short dry-to-tape time, but also unexpectedly exhibited 30 minutes wet-edge time with high gloss and low haze value in the overspray area of the panels, when formulated with a low flash point diketone such as 2,4-pentanedione in combination of a high flash point diketone, such as 2,2,6,6-tetramethyl-3,5-heptanedione (TMHD).

The compositions of Examples 1 to 5 were further cured at ambient temperature overnight after exposure to UV radiation and tested for properties of impact resistance, dry adhesion, wet adhesion and Skydrol resistance. Results in Table 8 indicate that compositions of the present invention exhibited excellent impact resistance, Skydrol fluid resistance, dry adhesion as well as wet adhesion.

The various examples of the present invention as presented herein are each understood to be non-limiting with respect to the scope of the invention.

Whereas particular aspects of this invention have been described above for purposes of illustration, it will be evident to those skilled in the art that numerous variations of the details of the present invention may be made without departing from the scope of the invention as defined in the appended claims.

Therefore, we claim:

1. A curable film-forming composition comprising:
   (a) a curing agent comprising reactive isocyanate functional groups;
   (b) a film-forming compound comprising functional groups reactive with the reactive isocyanate functional groups in (a);
   (c) a photo-latent catalyst;
   (d) a beta-diketone having a flash point higher than 60° C. (140° F.) as measured using ASTM D56-16; and
   (e) a beta-diketone having a flash point lower than or equal to 60° C. (140° F.) as measured using ASTM D56-16.

2. The curable film-forming composition of claim 1, wherein the beta-diketone (d) comprises an aliphatic, hindered beta-diketone.

3. The curable film-forming composition of claim 1, wherein the beta-diketone (e) comprises an aliphatic beta-diketone.

4. The curable film-forming composition of claim 3, wherein the beta-diketone (e) comprises 2,4-pentanedione.

5. The curable film-forming composition of claim 1, wherein the curing agent (a) comprises a diisocyanate and/or a triisocyanate.

6. The curable film-forming composition of claim 1, wherein the film-forming compound (b) comprises an acrylic polymer, a polyether polymer, and/or a polyester polymer.

7. The curable film-forming composition of claim 1, wherein the photo-latent catalyst (c) comprises at least one organometallic compound of titanium, tin, aluminum, zirconium and/or bismuth.

8. The curable film-forming composition of claim 1, wherein the photo-latent catalyst (c) is present in the curable film-forming composition in an amount of 0.01 to 2.0 percent by weight, based on the total weight of resin solids in the curable film-forming composition.

9. The curable film-forming composition of claim 1, wherein the beta-diketone (d) is present in the curable film-forming composition in an amount of 0.01 to 8.0 percent by weight, based on the total weight of resin solids in the curable film-forming composition.

10. The curable film-forming composition of claim 1, wherein the curable film-forming composition comprises a clear coat.

11. A method of controlling the rate of cure of a curable film-forming composition, comprising adding to the curable film-forming composition a catalyst component comprising:
(i) a photo-latent catalyst;
(ii) a beta-diketone having a flash point higher than 60° C. (140° F.) as measured using ASTM D56-16; and
(iii) an aliphatic beta-diketone having a flash point lower than or equal to 60° C. (140° F.) as measured using ASTM D56-16, wherein the curable film-forming composition comprises:
(a) a curing agent comprising reactive isocyanate functional groups; and
(b) a film-forming compound comprising functional groups reactive with the reactive isocyanate functional groups in the curing agent (a).

12. The method of claim 11, wherein the beta-diketone (ii) comprises an aliphatic, hindered beta-diketone.

13. The method of claim 11, wherein the beta-diketone (iii) comprises 2,4-pentanedione.

14. The method of claim 11, wherein the curing agent (a) comprises at least one of a diisocyanate and a triisocyanate.

15. The method of claim 11, wherein the film-forming compound (b) comprises at least one of an acrylic polymer, a polyether polymer, and a polyester polymer.

16. The method of claim 11, wherein the photo-latent catalyst (i) comprises at least one organometallic compound of titanium, tin, aluminum, zirconium or bismuth.

17. The method of claim 11, further comprising after adding the catalyst component to the curable film-forming composition: applying the curable film-forming composition to a substrate to form a coated substrate; and exposing the coated substrate to conditions for a time sufficient to at least partially cure the curable film-forming composition.

18. The method of claim 17, wherein the coated substrate is exposed to actinic radiation or to an elevated temperature for a time sufficient to at least partially cure the curable film-forming composition.

19. A method of increasing the wet-edge time of a curable film-forming composition, comprising adding to the curable film-forming composition a catalyst component comprising:
(i) a photo-latent catalyst;
(ii) a beta-diketone having a flash point higher than 60° C. (140° F.) as measured using ASTM D56-16; and
(iii) an aliphatic beta-diketone having a flash point lower than or equal to 60° C. (140° F.) as measured using ASTM D56-16, wherein the curable film-forming composition comprises:
(a) a curing agent comprising reactive isocyanate functional groups; and
(b) a film-forming compound comprising functional groups reactive with the reactive isocyanate functional groups in the curing agent (a).

20. The method of claim 19, wherein the beta-diketone (ii) comprises an aliphatic, hindered beta-diketone.

21. The method of claim 19, wherein the beta-diketone (iii) comprises 2,4-pentanedione.

* * * * *